United States Patent [19]

Henk et al.

[11] 4,294,580
[45] Oct. 13, 1981

[54] REACTIVE DYESTUFFS, THEIR PREPARATION AND THEIR USE FOR DYEING MATERIALS CONTAINING OH OR N

[75] Inventors: Hermann Henk, Cologne; Klaus Wunderlich, Leverkusen; Peter Wild, Alten Buseck, all of Fed. Rep. of Germany

[73] Assignee: Bayer Aktiengesellschaft, Leverkusen, Fed. Rep. of Germany

[21] Appl. No.: 108,307

[22] Filed: Dec. 31, 1979

[30] Foreign Application Priority Data

Jan. 16, 1979 [DE] Fed. Rep. of Germany ....... 2901546

[51] Int. Cl.$^3$ .............................................. C09B 62/06
[52] U.S. Cl. ........................................ 8/549; 8/680; 8/688; 8/917; 8/918; 260/153; 260/369; 544/188; 544/189; 544/194; 544/204
[58] Field of Search ............... 260/153, 369; 544/188, 544/194, 189, 204; 8/549, 680, 688

[56] References Cited

U.S. PATENT DOCUMENTS

| | | | |
|---|---|---|---|
| 3,983,588 | 10/1976 | Buhler et al. | 8/688 |
| 4,009,000 | 2/1977 | Buhler et al. | 8/688 |
| 4,246,174 | 1/1981 | Groll | 8/661 |

FOREIGN PATENT DOCUMENTS

| | | |
|---|---|---|
| 2652119 | 5/1978 | Fed. Rep. of Germany . |
| 2654351 | 6/1978 | Fed. Rep. of Germany . |
| 1477071 | 6/1977 | United Kingdom . |
| 1477073 | 6/1977 | United Kingdom . |
| 1526840 | 10/1978 | United Kingdom . |
| 1564647 | 4/1980 | United Kingdom . |

*Primary Examiner*—A. Lionel Clingman
*Attorney, Agent, or Firm*—Sprung, Felfe, Horn, Lynch & Kramer

[57] ABSTRACT

Dyestuffs of the formula

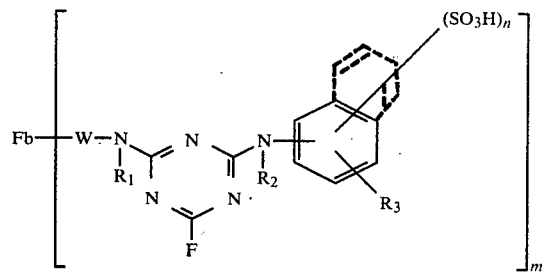

wherein
Fb, W, $R_1$, $R_2$, $R_3$, n and m have the meaning given in the description, and their use for dyeing and printing materials containing hydroxyl groups or nitrogen, such as textile fibres, filaments and fabrics of wool, silk or synthetic polyamide or polyurethane fibres, and for washfast dyeing and printing natural or regenerated cellulose.

The dyeings obtained are distinguished by good fastness to wet processing.

9 Claims, No Drawings

REACTIVE DYESTUFFS, THEIR PREPARATION AND THEIR USE FOR DYEING MATERIALS CONTAINING OH OR N

The invention relates to reactive dyestuffs of the formula

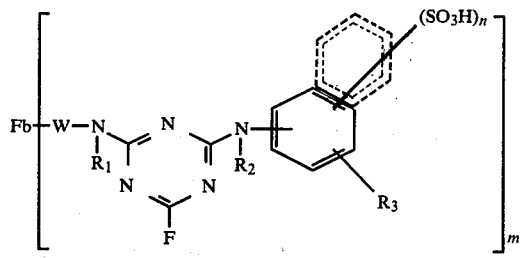

wherein
Fb denotes the radical of an organic dyestuff, W denotes a direct bond or a bridge member, W being bonded to a C atom of an aromatic-carbocyclic ring of the chromophor Fb,
$R_1$ denotes hydrogen, optionally substituted $C_1$–$C_4$-alkyl or aralkyl,
$R_2$ denotes substituted $C_1$–$C_4$-alkyl,
$R_3$ denotes hydrogen, $C_1$–$C_4$-alkyl, $C_1$–$C_4$-alkoxy, halogen, especially chlorine, carboxyl, $C_1$–$C_4$-alkoxycarbonyl, $C_1$–$C_4$-alkyl- or -dialkyl-aminocarbonyl, optionally substituted arylaminocarbonyl, sulpho, $C_1$–$C_4$-alkyl- or -dialkyl-aminosulphonyl, hydroxyl, optionally substituted $C_1$–$C_4$-alkyl- or aryl-carbonylamino, formylamino, oxalylamino, optionally substituted ureido or sulphomethylene,
n is 0, 1, 2 or 3 and
m is 1 or 2.

Fb preferably represents the radical of a watersoluble azo dyestuff, anthraquinone dyestuff, phthalocyanine dyestuff or formazan dyestuff, especially the radical of such a dyestuff which contains sulphonic acid groups.

Examples of suitable bridge members W are: —SO—, —CO—, -alkylene—CO—, -arylene-, -arylene-$SO_2$—, -arylene-CO—, -alkylene- or -amino-CO—, —$SO_2$-arylene-, —$SO_2$-alkylene, —$SO_2$-alkarylene-,

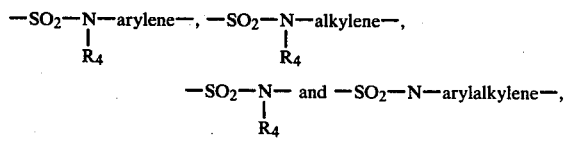

wherein
$R_4$ denotes hydrogen, optionally substituted $C_1$–$C_4$-alkyl or aralkyl and
the alkylene, aralkylene and arylene groups can carry further substituents.

Preferred dyestuffs within the scope of the formula I are those of the formula II

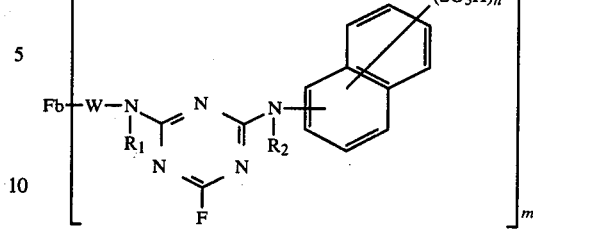

wherein
Fb, W, $R_1$, $R_2$, m and n have the abovementioned meaning.
Dyestuffs of the formula III

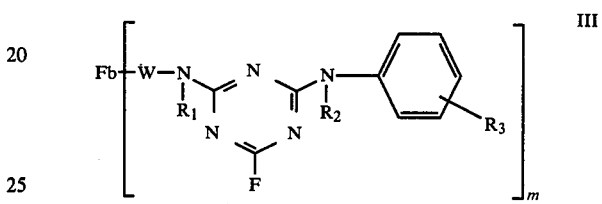

wherein
Fb, W, $R_1$, $R_2$, $R_3$ and m have the abovementioned meaning,
are also of particular importance.

Examples of suitable substituents $R_2$ are $C_1$–$C_4$-alkyl substituted by sulpho, carboxyl, alkoxycarbonyl, cyano, halogen, alkoxy or, in particular, hydroxyl, such as —$CH_2$—$SO_3H$, —$CH_2$—COOH, —$CH_2$—$CH_2$—CN, —$CH_2$—$CH_2$—Cl, —$CH_2$—$CH_2$—$OCH_3$, —$CH_2$—$CH_2$—OH, —$CH_2$—CH(OH)—$CH_3$ and —$CH_2$—$CH_2$—COOH.

Within the formulae (I), (II) and (III), Fb, described in the following text as the dyestuff Fb—H without the reactive portion, preferably corresponds to the following formulae:
1. Azo dyestuffs of the formula $$A-N=N-B \qquad (IV)$$

wherein
A represents the radical of a heterocyclic or carbocyclic diazo component, preferably from the benzene, naphthalene or triazole series, and
B represents the radical of a heterocyclic, carbocyclic or CH-acid coupling component, in particular the radical of an optionally further substituted phenol, naphthol, aniline, naphthylamine, 5-aminopyrazole, 5-pyrazolone, pyridone, aminopyridine, acetoacetic acid arylide, indole or pyrimidine.

The substituents W are linked to the azo dyestuff via a C atom of the diazo component and/or of the coupling component.

Particularly valuable dyestuffs of this series are those which contain water-soluble groups, such as sulphonic acid groups or carboxyl groups. The azo dyestuffs can be metal-free or in the form of metal complexes, copper complexes, chromium complexes and cobalt complexes being preferred.

The groups which form metal complexes, preferably hydroxyl groups, carboxyl groups and amino groups, are in the ortho-position relative to the azo group.

The diazo components A and the coupling components B can be substituted, for example by the following substituents: sulpho, nitro, halogen, such as fluorine, chlorine and bromine, $C_1$-$C_4$-alkyl which is optionally substituted by chlorine, $C_1$-$C_4$-alkoxy, hydroxyl or cyano, $C_1$-$C_4$-alkoxy which is optionally substituted by $C_1$-$C_4$-alkoxy, hydroxyl or cyano, $C_1$-$C_4$-alkylmercapto, $C_1$-$C_4$-alkylsulphonyl, phenyl or naphthyl which is optionally substituted by sulpho, amino, $C_1$-$C_4$-alkyl, $C_1$-$C_4$-alkoxy, nitro or halogen, trifluoromethyl, amino, hydroxyl, $C_1$-$C_4$-alkylcarbonylamino, $C_1$-$C_4$-alkylsulphonylamino, benzoylamino or benzenesulphonylamino which is optionally substituted by sulpho, $C_1$-$C_4$-alkyl, $C_1$-$C_4$-alkoxy, nitro or halogen, phenyl-$C_1$-$C_4$-alkyl which is optionally substituted in the phenyl nucleus by sulpho, $C_1$-$C_4$-alkyl, $C_1$-$C_4$-alkoxy, nitro or halogen, phenylazo or naphthylazo which is optionally substituted in the phenyl nucleus or naphthalene nucleus by hydroxyl, amino, sulpho, $C_1$-$C_4$-alkyl, $C_1$-$C_4$-alkoxy, nitro or halogen, $C_1$-$C_4$-alkyl-carbonyloxy, benzoyloxy which is optionally substituted by $C_1$-$C_4$-alkyl, $C_1$-$C_4$-alkoxy, nitro or halogen, aminocarbonyl, mono- or di-$C_1$-$C_4$-alkylamino, ureido, carboxyl, cyano, carboxamide or sulphonamide which is optionally substituted on the nitrogen by $C_1$-$C_4$-alkyl, phenyl or benzyl, it being possible for alkyl to be further substituted by sulpho or sulphato and for phenyl and benzyl to be further substituted by sulpho, $C_1$-$C_4$-alkyl, $C_1$-$C_4$-alkoxy, halogen or nitro, $C_1$-$C_4$-alkylsulphonylaminosulphonyl or phenylsulphonylaminosulphonyl which is optionally substituted in the phenyl nucleus by methyl, methoxy, chlorine or nitro.

Preferred azo dyestuffs Fb-H correspond to the formula

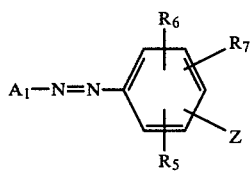
(V)

wherein $A_1$ denotes a phenyl or naphthyl radical which can be substituted by sulpho, carboxyl, nitro, chlorine, $C_1$-$C_4$-alkyl, $C_1$-$C_4$-alkoxy, phenyl or naphthyl which is optionally substituted by sulpho, amino or $C_1$-$C_4$-alkyl, amino, acetylamino, benzyl which is optionally substituted by amino, sulpho or $C_1$-$C_4$-alkyl, phenylazo or naphthylazo which is optionally substituted by amino, $C_1$-$C_4$-alkyl, sulpho, $C_1$-$C_4$-alkoxy or hydroxyl or trifluoromethyl, Z denotes hydroxyl, alkoxy which is optionally substituted by hydroxyl or $C_1$-$C_4$-alkoxy or amino which is optionally substituted by $C_1$-$C_4$-alkyl, phenyl or benzyl, it being possible for alkyl to be further substituted by cyano, hydroxyl or $C_1$-$C_4$-alkoxy and for phenyl and benzyl to be further substituted by methyl, methoxy, chlorine, nitro or sulpho, and $R_5$, $R_6$ and $R_7$ independently of one another denote hydrogen, $C_1$-$C_4$-alkyl, $C_1$-$C_4$-alkoxy, amino, $C_1$-$C_4$-alkylcarbonylamino, phenyl which is optionally substituted by $C_1$-$C_4$-alkyl, amino, hydroxyl or sulpho.

Further preferred azo dyestuffs correspond to the formula

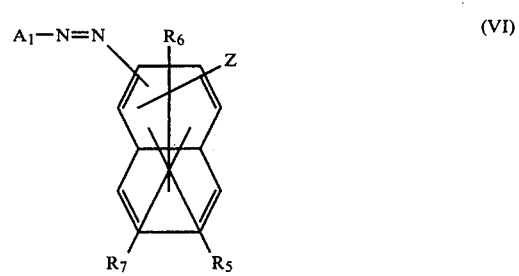
(VI)

wherein $A_1$, $R_5$, $R_6$, $R_7$ and Z have the abovementioned meaning.

Further preferred azo dyestuffs correspond to the formula

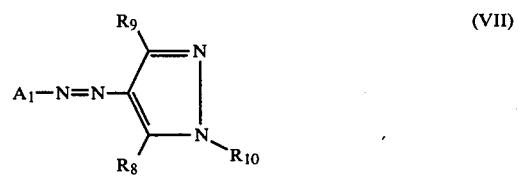
(VII)

wherein $A_1$ has the abovementioned meaning, $R_8$ denotes amino or hydroxyl, $R_9$ denotes $C_1$-$C_4$-alkyl, preferably methyl or carboxyl, and $R_{10}$ denotes phenyl or naphthyl which is optionally substituted by chlorine, $C_1$-$C_4$-alkyl, sulpho, $C_1$-$C_4$-alkoxy or amino.

Another preferred group of azo compounds corresponds to the formula

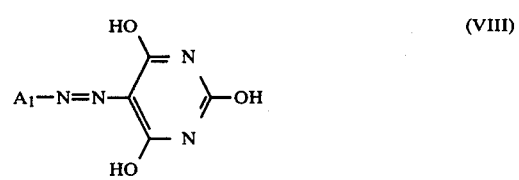
(VIII)

wherein $A_1$ has the abovementioned meaning.

Dyestuffs of the formula

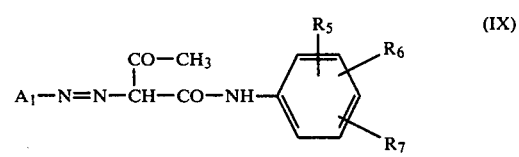
(IX)

wherein $A_1$, $R_5$, $R_6$ and $R_7$ have the abovementioned meaning, are also particularly valuable.

Azo dyestuffs of the formula

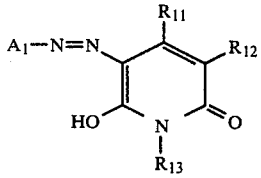 (X)

wherein
$R_{11}$ denotes $C_1$–$C_4$-alkyl, aryl, carboxyl or hydroxyl,
$R_{12}$ denotes cyano, carboxyl, sulpho, sulpho-$C_1$–$C_4$-alkyl or aminocarbonyl,
$R_{13}$ denotes hydrogen, $C_1$–$C_4$-alkyl, aryl or aralkyl and
$A_1$ has the abovementioned meaning,
and of the formula

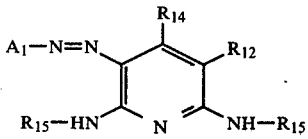 (XI)

wherein
$R_{12}$ and $A_1$ have the abovementioned meaning,
$R_{14}$ denotes $C_1$–$C_4$-alkyl or amino and
$R_{15}$ denotes hydrogen or $C_1$–$C_4$-alkyl, are likewise preferred.
Preferred dyestuffs amongst those of the formulae (V) to (XI) are those in which
$A_1$ represents the radical of an amine of the formula

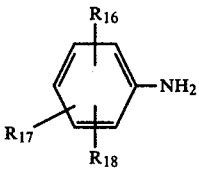 (XII)

wherein
$R_{16}$ denotes hydrogen, sulpho, hydroxyl, carboxyl or amino,
$R_{17}$ denotes hydrogen, chlorine, nitro, aminosulphonyl, $C_1$–$C_4$-alkyl, $C_1$–$C_4$-alkoxy, amino, sulpho, hydroxyl or phenylazo or naphthylazo which is optionally substituted in the phenyl or naphthyl nucleus by hydroxyl, sulpho or amino and
$R_{18}$ denotes hydrogen chlorine, nitro, $C_1$–$C_4$-alkyl or $C_1$–$C_4$-alkoxy, or of the formula

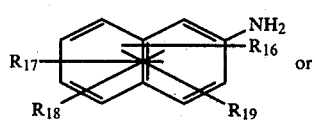 (XIII)

(XIV)

wherein
$R_{16}$, $R_{17}$ and $R_{18}$ have the abovementioned meanings and $R_{19}$ denotes hydrogen, chlorine, nitro, aminosulphonyl, $C_1$–$C_4$-alkyl, $C_1$–$C_4$-alkoxy, amino, sulpho, hydroxyl or phenylazo or naphthylazo which is optionally substituted in the phenyl or naphthyl nucleus by hydroxyl, sulpho or amino.

2. Anthraquinone dyestuffs of the formula

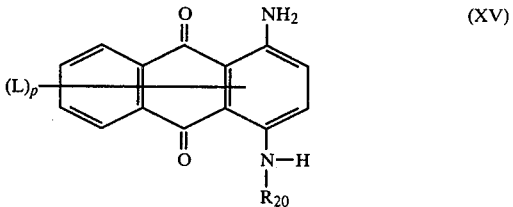 (XV)

wherein
L denotes hydrogen or a substituent,
$R_{20}$ denotes hydrogen, alkyl or aralkyl and
p denotes an integer from 1 to 6,
the reactive radical being bonded to the amino group in the 4-position via the bridge member W.

Preferably, L represents hydrogen, halogen, in particular chlorine, amino or hydroxyl, or very particularly preferably sulpho, $R_{20}$ represents hydrogen, $C_1$–$C_4$-alkyl or benzyl and p represents 1 or 2.

Examples of anthraquinone components which may be mentioned are: 1-amino-4-(3'-amino-phenylamino)-anthraquinone-2,4'-disulphonic acid, 1-amino-4-(4'-aminophenylamino)-anthraquinone-2,3'-disulphonic acid, 1-amino-4-(4'-methyl-amino-phenylamino)-anthraquinone-2,3'-disulphonic acid, 1-amino-4-(4'-aminophenylamino)-anthraquinone-2,6-disulphonic acid and the corresponding -2,7-, -2,5- and -2,8-disulphonic acids, 1-amino-4-(3'-aminophenylamino)-anthraquinone-2,5-, -2,6-, -2,7- or -2,8-disulphonic acid, 1-amino-4-(3'-amino-phenylamino)-anthraquinone-2,4',5-trisulphonic acid and the corresponding -2,4',6-, -2,4',7- and -2,4',8-trisulphonic acids, 1-amino-4-(4'-aminophenylamino)-anthraquinone-2,3',5-trisulphonic acid and the corresponding -2,3',8-trisulphonic acid, 1-amino-4-(4'-aminophenylamino)-anthraquinone-2,2'-disulphonic acid, 1-amino-4-(4'-methylamino-phenylamino)-anthraquinone-2,2'-disulphonic acid, 1-amino-4-(5'-amino-2'-methyl-phenylamino)-anthraquinone-2,4'-disulphonic acid, 1-amino-4'-(5'-amino-4'-methylphenylamino)-anthraquinone-2,2'-disulphonic acid, 1-amino-4-(3'-amino-2'-methyl-phenylamino)-anthraquinone-2,5'-disulphonic acid, 1-amino-4-(5'-amino-2',6'-dimethylphenylamino)-anthraquinone-2,3'- and -2,4'-disulphonic acid, 1-amino-4-(5'-amino-2',4',6'-trimethylphenylamino)-anthraquinone-2,3'-disulphonic acid, 1-amino-4-(5'-aminomethyl-2',6'-dimethyl-phenylamino)-anthraquinone-2,3'-disulphonic acid, 1-amino-4-(5'-methylaminomethyl-2',6'-dimethyl-phenylamino)-anthraquinone-2,3'-disulphonic acid, 1-amino-4-(4'-methylaminomethyl-phenylamino)-anthraquinone-2,2'-disulphonic acid, 1-amino-4-(4'-amino-3'-carboxy-phenylamino)-anthraquinone-2,6-disulphonic acid, 1-amino-4-(5'-amino-2'-methoxy-phenylamino)-anthraquinone-2,4'-disulphonic acid, 1-amino-4-[4'-(4''-aminophenyl)-phenylamino]-anthraquinone-2,2'',3'-trisulphonic acid, 1-amino-4-(2',6'-dimethyl-3'-sulphonamido)-anthraquinone-2-sulphonic acid and 1-amino-4-(4'-amino-2'-carboxy-phenylamino)-anthraquinone-2,6- and -2,7-disulphonic acid.

3. Azaporphin dyestuffs of the formula

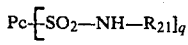   (XVI)

wherein
Pc denotes the radical of a copper phthalocyanine or nickel phthalocyanine which is optionally substituted by $C_1$–$C_4$-alkyl, $C_1$–$C_4$-alkoxy, sulpho or sulphonamide which is optionally monosubstituted or disubstituted by $C_1$–$C_4$-alkyl, benzyl or phenyl,
$R_{21}$ denotes hydrogen, alkyl or aralkyl, preferably hydrogen, $C_1$–$C_4$-alkyl or benzyl, and
q denotes a number from 1 to 4.

The reactive group is bonded to the nitrogen atom of the sulphonamide group via the bridge member W.

Those azaporphin dyestuffs in which Pc represents a copper phthalocyanine or nickel phthalocyanine radical which is optionally substituted by 1–3.5 sulphonic acid or sulphonamide groups are preferred.

4. Formazan dyestuffs of the formula

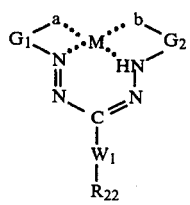   (XVII)

wherein
M is a heavy metal atom, preferably a copper atom,
$G_1$ and $G_2$ are aromatic-carbocyclic or aromatic-heterocyclic rings which carry the substituents a and b in the o-position relative to the formazan nitrogen atoms,
a and b denote hydrogen, hydroxyl, carboxyl or aminosulphonyl,
$W_1$ denotes a direct bond or a bridge member and
$R_{22}$ denotes alkyl or aryl,
and the aromatic-carbocyclic or aromatic-heterocyclic rings $G_1$ and $G_2$ can contain further substituents, such as $C_1$–$C_4$-alkyl, $C_1$–$C_4$-alkoxy, chlorine, bromine, amino or, preferably, sulpho.

Suitable aromatic-carbocyclic and aromatic-heterocyclic rings $G_1$ and $G_2$ are preferably benzene rings and naphthalene rings.

Examples of suitable bridge members $W_1$ are —CONH—, —CO— or —$SO_2$—.

Suitable alkyl $R_{22}$ is $C_1$–$C_4$-alkyl which is optionally substituted by $C_1$–$C_4$-alkoxy.

Suitable aryl $R_{22}$ is phenyl or naphthyl which is optionally substituted by $C_1$–$C_4$-alkyl, $C_1$–$C_4$-alkoxy, chlorine, bromine, sulpho, amino or phenylazo, it being possible for the phenylazo groups to be further substituted by $C_1$–$C_4$-alkyl, $C_1$–$C_4$-alkoxy, nitro, chlorine, sulpho or amino.

Within the scope of the dyestuffs described above, those of the general formula III in which $R_2$ is a 2-hydroxyethyl radical, in particular those of the formulae IV to XVII, are preferred.

Quite generally, those dyestuffs in which $R_1$ and $R_3$ denote H, $R_2$ denotes —$C_2H_4OH$ and W denotes a direct bond and which contain 1–8 sulphonic acid groups are preferred.

The dyestuffs according to the invention are obtained by a process in which 2,4,6-trifluoro-1,3,5-triazine, dyestuffs or dyestuff precursors which contain at least one amino or amide group with at least one reactive hydrogen atom, and a compound

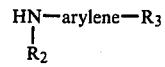

are reacted in any desired sequence.

Preferably, dyestuffs or dyestuff precursors containing amino or amide groups are first reacted with 2,4,6-trifluoro-1,3,5-triazine and the product is then subjected to a condensation reaction with a compound

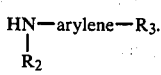

Depending on the nature of the starting compounds used, this procedure is carried out in an organic, organic-aqueous or aqueous medium at low temperatures, preferably in the presence of alkaline condensing agents, such as pyridine or aqueous alkali metal carbonate, alkali metal bicarbonate or alkali metal hydroxide solutions.

In the case of dyestuff precursors, after the reaction with 2,4,6-trichloro-1,3,5-triazine, the products are converted into the desired dyestuffs in a suitable manner, for example by diazotising and coupling.

The dyestuffs obtainable by the processes described above can be subjected to other reactions customary for dyestuffs. For example, metallisable dyestuffs can be treated with metal-donating agents, in particular with chromium salts, cobalt salts, copper salts or nickel salts, dyestuffs which contain reducible groups, in particular nitro groups, can be reduced and dyestuffs which contain acylatable groups, in particular acylatable amino groups, can be acylated.

Preferably, dyestuffs which contain amide or amino groups and have the formula

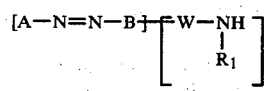   (XVIII)

wherein A, B, W and $R_1$ have the meaning given,

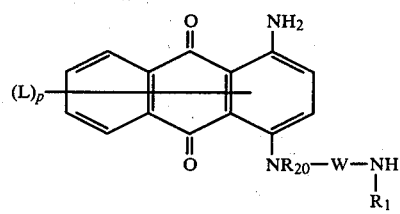   (XIX)

wherein L, $R_{20}$, W, $R_1$ and p have the meaning given,

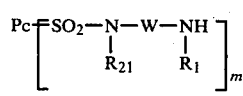   (XX)

wherein Pc, $R_{21}$, W, $R_1$ and m have the meaning given, and

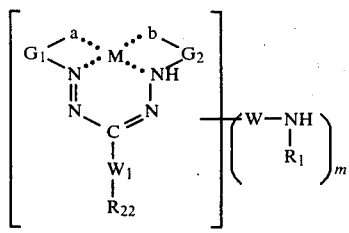 (XXI)

wherein
G$_1$, G$_2$, a, b, W$_1$, R$_{22}$, W and R$_1$ have the meaning given and
m denotes 1 or 2,
are reacted with 2,4,6-trifluoro-1,3,6-triazine and a compound

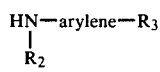

by the process described above.

The new dyestuffs are valuable products which are suitable for the most diverse applications. Being water-soluble compounds, they are of preferred interest for dyeing and printing textile materials containing hydroxyl groups or nitrogen, in particular textile materials of natural and regenerated cellulose, and furthermore of wool, silk or synthetic polyamide or polyurethane fibres. They are distinguished by a surprisingly high degree of fixing.

The products are particularly suitable as reactive dyestuffs for dyeing cellulose materials by the techniques known for such dyeing.

For dyeing cellulose, the dyestuffs are preferably employed in an aqueous solution, to which alkaline substances, such as alkali metal hydroxides or alkali metal carbonates, or compounds which are converted into alkaline substances, such as alkali metal bicarbonates, can be added. Other auxiliaries can be added to the solution, but these should not react with the dyestuffs in an undesirable manner. Examples of such additives are surface-active substances, such as alkylsulphates, substances which prevent migration of the dyestuff, dyeing auxiliaries, such as urea (to improve the solubility and fixing of the dyestuffs), or inert thickeners, such as oil-in-water emulsions, tragacanth, starch, alginate or methylcellulose.

The solutions or pastes thus prepared are applied, for example by padding in a padder (short liquor) or by printing, to the material to be dyed and the material is then heated to an elevated temperature, preferably 40° to 150° C., for some time. The heat treatment can be carried out in a hot flue, in a steamer, on heated rollers or by introducing the material into heated concentrated salt baths; each of these treatments can be carried out by itself or the treatments can be carried out successively in any desired sequence.

If a padding liquor or dyeing liquor without an alkali is used, the dry goods are subsequently passed through an alkaline solution, to which sodium chloride or sodium sulphate decahydrate is added. The addition of salt reduces migration of the dyestuff from the fibre.

The material to be dyed can also be pre-treated with one of the abovementioned acid-binding agents and then treated with a solution or paste of the dyestuff, and finally, as indicated, the dyestuff is fixed at elevated temperature.

For dyeing from a long liquor, the meterial is introduced into an aqueous solution of the dyestuff (liquor ratio of 1:5 to 1:40) at room temperature and dyeing is carried out for 40 to 90 minutes, the temperature being raised to 85° C. if appropriate and a salt, for example sodium sulphate, and then an alkali, for example sodium phosphates, sodium carbonate or alkalis, being added in portions. The chemical reaction between the dyestuff and fibre occurs during this procedure. When the chemical fixing has taken place, the dyed material is rinsed hot and then soaped, whereupon non-fixed residues of the dyestuff are removed. Dyeings which are outstandingly fast, especially to wet processing and light, are obtained.

In the so-called pad-cold batch process, subsequent heating of the padded fabric can be spared by storing the fabric at room temperature for some time, for example 20 to 40 hours. A stronger alkali than in the dyeing process described above, from a long liquor, is employed in this process.

For printing materials containing hydroxyl groups, a printing paste consisting of the dyestuff solution, a thickener, such as sodium alginate, and an alkaline compound or a compound which splits off an alkali on heating, such as sodium carbonate, sodium phosphate, potassium carbonate, potassium acetate or sodium bicarbonate or potassium bicarbonate, is used and the printed material is rinsed and soaped.

If the dyestuffs contain groupings which form metal complexes, the fastness properties of the dyeings and prints can frequently be improved by subsequent treatment of the material with agents which donate metals, such as copper salts, for example copper sulphate, or chromium salts, cobalt salts or nickel salts, such as chromium acetate, cobalt sulphate or nickel sulphate.

Textile materials containing amide groups, such as wool, silk or synthetic polyamide or polyurethane fibres, are generally dyed in the acid to neutral range by the dyeing methods customary for these materials, it sometimes being advantageous finally to increase the pH value of the dyebath, for example to a pH of 6.5 to 8.5.

The dyestuffs are applied, for example, to the synthetic polyamide fabric in the form of solutions or, preferably, in a dispersed form and the fabric is then after-treated, if appropriate together with acid-binding agents, such as sodium carbonate, preferably in relatively small amounts. Particularly favourable results are achieved with those dyestuffs which are insoluble or only sparingly soluble in water. These dyestuffs are converted to a dyestuff dispersion by techniques which are in themselves customary, with the addition of the known auxiliaries, and are used as such in the dyebath and/or padding bath or in a printing paste. The auxiliaries suitable for this use are, inter alia, compounds which prevent migration of the dyestuff on the fibre, such as cellulose ethers, alkali metal chlorides and sulphates, wetting agents, such as condensation products of ethylene oxide and fatty alcohols or phenols, sulphonated fatty alcohols, solvents, such as thiodiglycol, and furthermore thickeners, such as starch, tragacanth, alginate thickener, gum arabic and the like.

The after-treatment of the dyeings, impregnations and prints obtained on the polyamide fibre fabric is preferably carried out at a temperature of 50°–110° C. over a period of 5 to 60 minutes. In this case also, if the dyestuffs used contain groupings which form metal complexes, the fastness properties of the dyeings can sometimes be improved by agents which denate metals, such as copper salts, for example copper sulphate, or chromium salts, cobalt salts or nickel salts, such as chromium acetate, cobalt sulphate or nickel sulphate.

The dyeings obtainable with the new dyestuffs are generally distinguished by good to very good fastness properties, in particular by outstanding fastness to wet processing.

subsequently stirred for 15 minutes. 4.5 g of N-(2-hydroxyethyl)-aniline are then added to the solution and the pH value is rapidly adjusted to 6.5. The mixture is kept at this value. Whilst subsequently stirring for two hours, the temperature is allowed to rise to 20°. The dyestuff, which has partly precipitated, is salted out completely with 30 g of sodium chloride, filtered off, washed with 10% strength sodium chloride solution and dried at 40° in vacuo. In the form of the free acid, the dyestuff corresponds to the formula

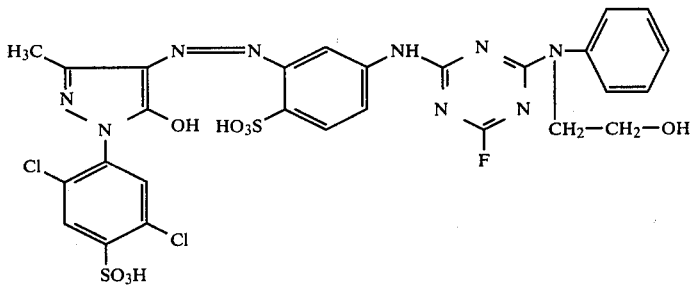

EXAMPLE 1

16 g of 1-(2',5'-dichloro-4'-sulphophenyl)-3-methyl-4-(5''-amino-2''-sulphophenylazo)-5-pyrazolone are dissolved in 300 ml of water. The pH value is adjusted to 4.0 and the solution is cooled to 0°–5°.

3.0 ml of cyanuric fluoride are added dropwise to the solution in the course of 5 minutes. At the same time, the pH value is kept at 3.5–4.0 by means of 20% strength sodium carbonate solution. The mixture is and dyes cotton, from a long liquor at 40°, in clear greenish-tinged yellow shades with good fastness to light and wet processing.

If the 2,4-diaminobenzenesulphonic acid and the 1-(2',5'-dichloro-4'-sulphophenyl)-methyl-5-pyrazolone in Example 1 are replaced by the diazo components and coupling components indicated in the table, further valuable dyestuffs which give the colour shades indicated are obtained.

| Example No. | Diazo component | Coupling component | Colour shade on cotton |
|---|---|---|---|
| 2 | 2,4-diaminobenzenesulphonic acid | 5-amino-3-methyl-1-(2'-methyl-4'-sulphonylphenyl)-pyrazole | yellow |
| 3 | 2,4-diaminobenzenesulphonic acid | 5-amino-3-phenyl-1-(2'-methoxy-5'-sulphophenyl)-pyrazole | yellow |
| 4 | 2,5-diaminobenzenesulphonic acid | 5-amino-3-phenyl-1-(2'-methoxy-5'-sulphophenyl)-pyrazole | yellow |
| 5 | 2,4-diaminobenzenesulphonic acid | 1-(β-carboxyethyl)-5-pyrazolone-3-carboxylic acid | greenish-tinged yellow |
| 6 | 2,4-diaminobenzenesulphonic acid | 1-(β-cyanoethyl)-5-pyrazolone-3-carboxylic acid | greenish-tinged yellow |
| 7 | 2,4-diaminobenzenesulphonic acid | 6-hydroxy-1,4-dimethyl-3-sulphomethyl-2-pyridone | greenish-tinged yellow |
| 8 | 2,4-diaminobenzenesulphonic acid | 4,6-dihydroxy-1-methyl-3-(N-methylaminocarbonyl)-2-pyridone | yellow |
| 9 | 2,4-diaminobenzenesulphonic acid | 1-naphthol-4,7-disulphonic acid | orange-red |
| 10 | 2,5-diaminobenzenesulphonic acid | 2,4-diamino-5-cyano-6-(3'-sulphophenyl)-pyridine | yellow |
| 11 | 2,4-diamino-5-chlorobenzenesulphonic acid | (4-amino-3,5-disulphophenyl)-acetoacetanilide | greenish-tinged yellow |
| 12 | 2,4-diaminobenzenesulphonic acid | 6-ureido-1-naphthol-3-sulphonic acid | orange |
| 13 | 2,4-diaminobenzenesulphonic acid | 7-(4'-sulphophenylamino)-1- | brown |
| 14 | 2,4-diaminobenzenesulphonic acid | 8-acetylamino-1-naphthol-3,6-disulphonic acid | red |
| 15 | 2,5-diaminobenzenesulphonic acid | 1-(4'-sulphophenyl)-3-carboxy-5-pyrazolone | reddish-tinged yellow |
| 16 | 2,5-diaminobenzenesulphonic acid | barbituric acid | greenish-tinged yellow |
| 17 | 2,5-diaminobenzenesulphonic acid | 7-phenylamino-1-naphthol-3,6-disulphonic acid | brown |
| 18 | 2,4-diamino-5-methoxybenzenesulphonic acid | 7-phenylamino-1-naphthol-3,6-disulphonic acid | brown-red |
| 19 | 2,5-diaminobenzenesulphonic acid | 7-amino-1-naphthol-3-sulphonic acid (coupled under acid conditions) | red |
| 20 | 2,5-aminobenzenesulphonic | 7-methylamino-1-naphthol-3-sulphonic | red |

-continued

| Example No. | Diazo component | Coupling component | Colour shade on cotton |
|---|---|---|---|
| | acid | acid (coupled under acid conditions) | |
| 21 | 2,5-diaminobenzenesulphonic acid | 7-amino-1-naphthol-4-sulphonic acid (coupled under acid conditions) | red-violet |
| 22 | 2,5-diaminobenzenesulphonic acid | 5-(2'-sulphophenylazo)-6-phenyl-amino-1-naphthol-3-sulphonic acid | red |

EXAMPLE 23

16.0 g of 1-amino-8-hydroxynaphthalene-3,6-disulphonic acid are dissolved in 200 ml of water by adjusting the pH value to 5.5 with 20% strength sodium carbonate solution. The solution is cooled to 0°–5° and 4.6 ml of cyanuric fluoride are then added dropwise in the course of 5 minutes. The pH value is kept at 4.0–4.5 with 20% strength sodium carbonate solution during the dropwise addition, and the mixture is then subsequently stirred at pH 4.5 for a further 10 minutes. 7.1 g of N-(2-hydroxyethyl)-aniline are now added to the solution and the pH value is kept at 6.5–7.0. After subsequently stirring the mixture for 2–3 hours, the condensation reaction has ended.

8.7 g of 2-aminobenzenesulphonic acid are dissolved in 100 ml of water whilst neutralising. The solution is cooled to 0°–5°, 10 ml of concentrated hydrochloric acid are added and diazotisation is carried out by adding 25 ml of 2 N sodium nitrite solution dropwise. After subsequently stirring the mixture for half an hour, any excess nitrite is removed with amidosulphonic acid.

The diazo compound is now added to the solution, prepared above, of the reactive coupling component at 0°–5° and the pH value of the coupling mixture is kept at 7.0–7.5 with 20% strength sodium carbonate solution. The mixture is subsequently stirred for 1 hour and the temperature is then allowed to rise to 20°. The pH value is adjusted to 6.5 and the dyestuff is salted out of the solution with 150 g of sodium chloride, filtered off, washed with 25% strength sodium chloride solution and dried at 40° in vacuo.

The dyestuff, which, in the form of the free acid, corresponds to the formula

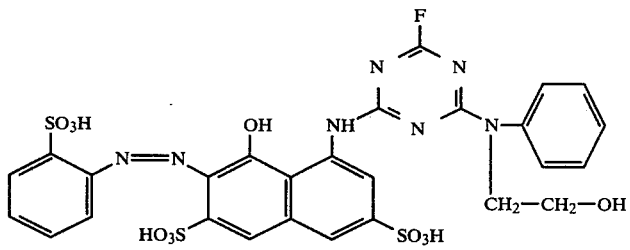

dyes cotton, from a long liquor, in bluish-tinged red shades with good fastness properties.

EXAMPLE 24

28.5 g of the disodium salt of 6-amino-1-hydroxy-2-(2'-sulphophenylazo)-naphthalene-3-sulphonic acid are dissolved in 900 ml of water. 6.0 ml of cyanuric fluoride are added dropwise to the solution, cooled to 0°–5°, in the course of 15 minutes and the pH value is kept at 5.0–5.5 with 20% strength sodium carbonate solution. The mixture is subsequently stirred for 15 minutes and 9.3 g of N-(2-hydroxyethyl)-aniline are then added dropwise. The pH value is then kept within the limits of 6.5 and 7.0. The mixture is then subsequently stirred for two hours, during which the temperature is allowed to rise to 20° and the above pH value is maintained further. The dyestuff is then salted out with 180 g of sodium chloride, filtered off and washed with 10% strength sodium chloride solution. It is subsequently dried at 40° in vacuo.

The product, which, in the form of the free acid, has the formula

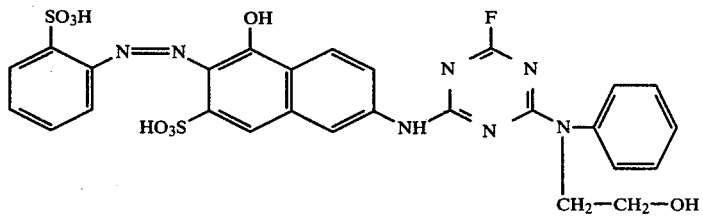

dyes cotton, from a long liquor, in yellowish-tinged orange shades with good fastness to light and wet processing.

Comparable dyestuffs are obtained when 2-aminobenzenesulphonic acid and 6-amino-1-naphthol-3-sulphonic acid are replaced by the diazo components and coupling components indicated in the following table.

| Example No. | Diazo component | Coupling component | Colour shade on cotton |
|---|---|---|---|
| 25 | 4-aminobenzene-1,3-disulphonic acid | 3-methyl-1-[6-amino-4,8-disulphonaphth-2-yl]-5-pyrazolone | yellow |
| 26 | 2-aminonaphthalene-4,8-disulphonic acid | 3-methylaniline | yellow |
| 27 | 2-aminonaphthalene-4,6,8-trisulphonic acid | 3-methylaniline | yellow |
| 28 | 2-aminonaphthalene-6,8-disulphonic acid | 3-aminoacetanilide | yellow |
| 29 | 2-aminonaphthalene-3,6,8-trisulphonic acid | 3-aminoacetanilide | yellow |
| 30 | 4-aminobenzene-1,3-disulphonic acid | 3-aminophenylurea | yellow |
| 31 | 2-aminobenzene-1,4-disulphonic acid | 3-aminophenylurea | yellow |
| 32 | 1-amino-4-(2',5'-disulphophenylazo)-naphthalene-6-sulphonic acid | 3-aminophenylurea | reddish-tinged brown |
| 33 | 2-aminonaphthalene-3,6,8-trisulphonic acid | 3-aminophenylurea | yellow |
| 34 | 2-amino-5-(4'-sulphophenylazo)-benzenesulphonic acid | 6-amino-1-naphthol-3-sulphonic acid | bluish-tinged red |
| 35 | 2-amino-1-sulphomethyl-naphthalene-5-sulphonic acid | 6-amino-1-naphthol-3-sulphonic acid | red |
| 36 | 2-amino-5-methoxy-benzenesulphonic acid | 6-amino-1-naphthol-3-sulphonic acid | scarlet |
| 37 | 2-aminonaphthalene-1,5-disulphonic acid | 6-amino-1-naphthol-3-sulphonic acid | orange |
| 38 | 2-aminonaphthalene-3,6-disulphonic acid | 6-amino-1-naphthol-3-sulphonic acid | orange |
| 39 | 2-amino-5-(4'-sulphophenylazo)-benzenesulphonic acid | 1-aminonaphthalene-6-sulphonic acid | yellow-brown |
| 40 | 1-amino-4-(2',5'-disulphophenylazo)-naphthalene-6-sulphonic acid | 1-aminonaphthalene-7-sulphonic acid | red-brown |
| 41 | 2,5-dimethoxy-4-(2,5-disulphophenylazo)-aniline | 3-ethylaminophenylurea | brown |
| 42 | 1-amino-4-[4',8'-disulphonaphthyl-2-azo]-naphthalene-7-sulphonic acid | 1-aminonaphthalene-6,8-disulphonic acid | brown |
| 43 | 1-amino-4-[4',8'-disulphonaphthyl-2-azo]-naphthalene-6-sulphonic acid | 1-aminonaphthalene-8-sulphonic acid | brown-red |
| 44 | aniline | 8-amino-1-naphthol-3,6-disulphonic acid | bluish-tinged red |
| 45 | 2-amino-5-methylbenzenesulphonic acid | 8-amino-1-naphthol-3,6-disulphonic acid | red |
| 46 | 2-aminonaphthalene-1-sulphonic acid | 8-amino-1-naphthol-3,6-disulphonic acid | claret red |
| 47 | 2-aminonaphthalene-1,5-disulphonic acid | 8-amino-1-naphthal-3,6-disulphonic acid | red |
| 48 | 2-aminonaphthalene-1,5-disulphonic acid | 8-amino-1-naphthol-3,5-disulphonic acid | red |
| 49 | 2-amino-1-sulphomethyl-naphthalene-5-sulphonic acid | 8-amino-1-naphthol-3,5-disulphonic acid | ruby |
| 50 | 2-methoxy-4-(2'-sulphophenylazo)-5-methylaniline | 8-amino-1-naphthol-3,6-disulphonic acid | blue |
| 51 | 1-amino-4-[4',6',8'-trisulphonaphthyl-2-azo]-naphthalene-6-sulphonic acid | 3-methylaniline | brown |

EXAMPLE 52

137.7 g of the copper complex azo dyestuff which is obtained from the diazonium salt of 2-amino-5-sulphobenzenecarboxylic acid by coupling with 3-methyl-1-[6'-amino-4',8'-disulphonaphth-2-yl]-5-pyrazolone and coppering the product in an acetate-buffered solution with copper-II sulphate solution are dissolved, at pH 5, in 3.5 l of water and the solution is cooled to 0°. 20 ml of cyanuric fluoride are added in the course of 15 minutes, the pH and temperature are kept constant and the mixture is then subsequently stirred for a further 15 minutes. 31 g of N-(2-hydroxyethyl)-aniline are now added, the pH value is kept at 6.5–7.0 and the temperature is allowed to rise to about 20° C. After subsequently stirring the mixture for 2–3 hours, the condensation reaction has ended. The dyestuff is salted out at room temperature, filtered off and dried.

The dyestuff, which, in the form of the free acid, corresponds to the formula

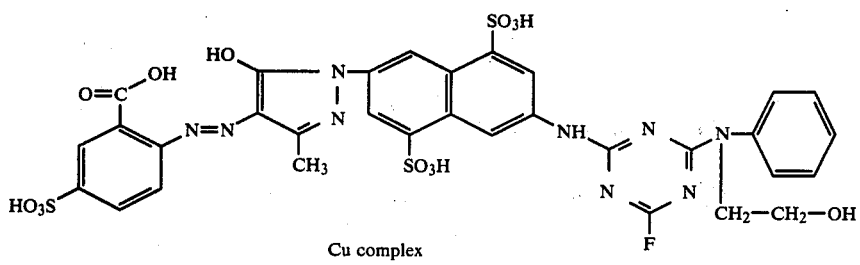

Cu complex dyes cotton and viscose staple in a yellow which is very fast to light and wash-resistant.

EXAMPLE 53

18.9 g of 2-aminophenol-4-sulphonic acid are diazotised and the diazotisation product is coupled to 31.9 g of 8-amino-1-naphthol-3,5-disulphonic acid at pH 8. After the coupling reaction, the mixture is warmed to 90° C. with 16 g of copper sulphate at pH 5 for 1 hour. The copper complex dyestuff is salted out and filtered off. The moist paste is dissolved in 600 ml of water and condensation reactions are carried out, first with 10 ml of cyanuric fluoride at pH 4.0–4.5 and at 0° C. and then with 15.5 g of N-(2-hydroxyethyl)-aniline at pH 7 and at room temperature, in each case with the aid of 20% strength sodium carbonate solution. The dyestuff is salted out, filtered off and dried in vacuo.

Cellulose fibres are dyed blue-violet by this dyestuff.

In the form of the free acid, the dyestuff corresponds to the formula:

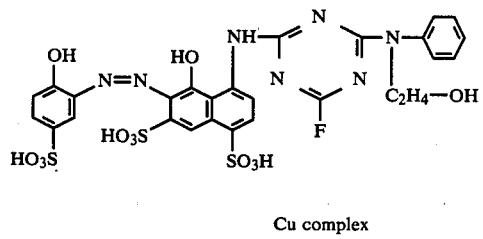

Cu complex

Further copper complex reactive dyestuffs are obtained when the diazo components and coupling components listed in the following table are used instead of the 2-aminophenyl-4-sulphonic acid and 8-amino-1-naphthol-3,5-disulphonic acid.

| Example No. | Diazo component | Coupling component | Colour shade on cotton |
|---|---|---|---|
| 54 | 2-amino-5-sulphobenzoic acid | 6-amino-1-naphthol-3-sulphonic acid | brown-red |
| 55 | 1-amino-2-naphthol-4-sulphonic acid | 6-amino-1-naphthol-4,8-disulphonic acid | navy blue |
| 56 | 2-aminonaphthalene-4,8-disulphonic acid (oxidatively coppered) | 8-amino-1-naphthol-3,6-disulphonic acid | reddish-tinged blue |
| 57 | 2-aminonaphthalene-6,8-disulphonic acid (oxidatively coppered) | 6-amino-1-naphthol-4,8-disulphonic acid | navy blue |
| 58 | 2-amino-6-nitronaphthalene-4,8-disulphonic acid (oxidatively coppered) | 6-amino-1-naphthol-3-sulphonic acid | blue |
| 59 | 2,4-diaminophenol | 8-amino-1-naphthol-5,7-disulphonic acid | bluish-tinged violet |
| 60 | 6-nitro-1-diazo-2-naphthol-4-sulphonic acid (reduced) | 8-amino-1-naphthol-5,7-disulphonic acid | blue |
| 61 | 2,4-diaminophenyl-6-sulphonic acid | 8-amino-1-naphthol-5,7-disulphonic acid | blue |
| 62 | 4-(2-sulphophenylazo)-2-methoxy-5-methylaniline | 6-amino-1-naphthol-3,5-disulphonic acid | blue |
| 63 | 2,5-diaminobenzenesulphonic acid | 4-(2'-hydroxy-5-sulphophenylazo)-resorcinol | brown |

EXAMPLE 64

109 g of the copper complex dyestuff obtained from the diazonium salt of 8-amino-1-phenyl-sulphonyloxynaphthalene-3,6-disulphonic acid by coupling to 6-acetylamino-1-naphthol-4,8-disulphonic acid at pH 8, subjecting the coupling product to oxidative coppering with copper sulphate and hydrogen peroxide and hydrolysing the N-acetyl and O-phenylsulphonyl groups are dissolved, at pH 5.5–6.0, in 4 l of water and successive condensation reactions are carried out with 14 ml of cyanuric fluoride at pH 6 and at 0° C. and with 21.7 g of N-(2-hydroxyethyl)-aniline at pH 7 and at room temperature. The dyestuff corresponds, in the form of the free acid, to the formula:

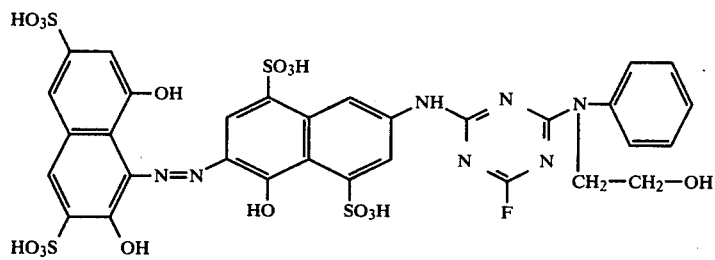

Cu complex and dyes cotton and viscose staple blue.

The dyestuff, which, in the form of the free acid, corresponds to the formula:

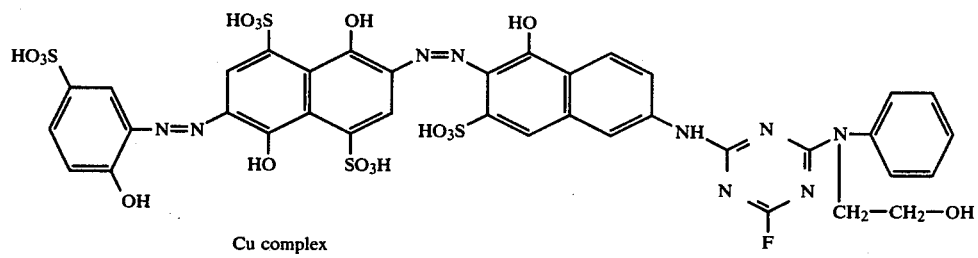

Cu complex

EXAMPLE 65

If the 8-amino-1-phenylsulphonyloxynaphthalene-3,6-disulphonic acid in Example 64 is replaced by an equivalent amount of 8-amino-1-phenylsulphonyloxynaphthalene-3,5-disulphonic acid, a dyestuff which dyes cotton and viscose staple in very fast greenish-tinged blue shades is obtained.

EXAMPLE 66

18.9 g of diazotised 2-aminophenol-4-sulphonic acid are coupled to 64.7 g of the copper complex azo dyestuff obtained from the diazonium salt of 6-amino-1-naphthol-4,8-disulphonic acid by coupling to 6-amino-1-naphthol-3-sulphonic acid and subsequently subjecting the coupling product to oxidative coppering. After salting out and filtering off the dyestuff, the moist dyestuff paste is dissolved in 1.8 l of water and the dyestuff is coppered a second time with 25 g of copper sulphate at pH 5 and at 50° C. in the course of one hour and is isolated again. The dyestuff paste is stirred in 1.9 l of water and condensation reactions are carried out, first with 10 ml of cyanuric fluoride at pH 5 and at 0° C. and then with 15.5 g of N-(2-hydroxyethyl)-aniline at pH 7 and at room temperature.

dyes cotton and viscose staple blue.

EXAMPLE 67

47.4 g of the 1:1 complex obtained by coupling the diazonium salt of 2-amino-4,6-dinitrophenyl to 2-aminonaphthalene-6-sulphonic acid and then cobalting the coupling product with cobalt sulphate heptahydrate at pH 5 and at room temperature are reacted, in 1,250 ml of water at pH 11 and at 45° C., with 55.4 g of the azo dyestuff obtained by coupling the diazonium salt of 2-amino-4-nitrophenyl-6-sulphonic acid to 6-amino-1-naphthol-3-sulphonic acid to give the 1:2 cobalt complex. This reaction takes about 2.5 hours. The dyestuff is then salted out with sodium chloride and filtered off.

The paste is suspended in 1.5 l of water and condensation reactions are carried out, first with 10 ml of cyanuric fluoride at pH 5 and at 0° C. and then with 15.5 g of N-(2-hydroxyethyl)-aniline at pH 7 and at room temperature.

Thereafter, the dyestuff is salted out, filtered off and dried in vacuo. The unsymmetric 1:2 cobalt complex thus prepared dyes cotton and viscose staple in dark brown shades. In the form of the free acid, it corresponds to the formula:

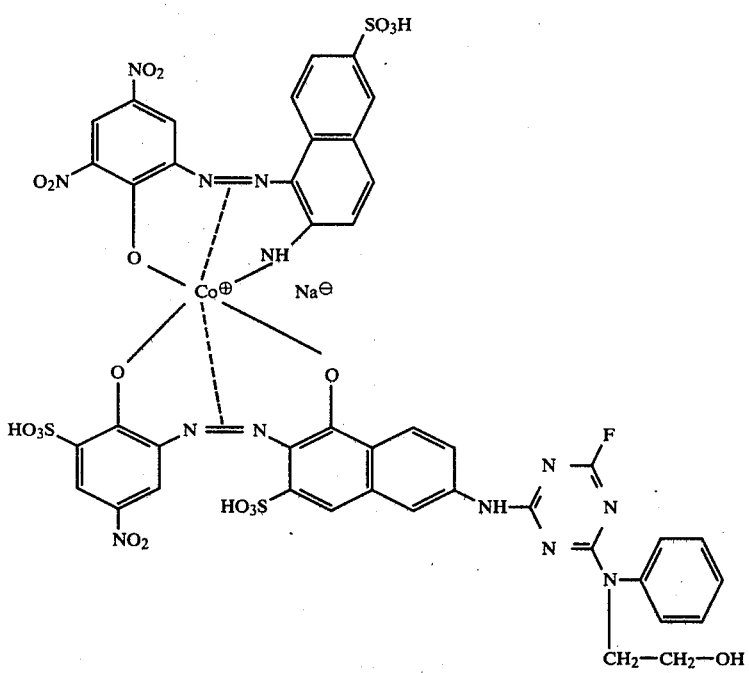

Symmetric 1:2 cobalt complex azo dyestuffs are obtained when the diazo components and coupling components mentioned in the following table are used.

| Example No. | Diazo component | Coupling component | Colour shade on cotton |
|---|---|---|---|
| 68 | 2-aminophenol-4-sulphonic acid | acetoacetic acid 4-aminoanilide | yellow |
| 69 | 2-amino-4-nitrophenol-6-sulphonic acid | 4-aminophenol | brown |
| 70 | 2-amino-4-nitrophenol-6-sulphonic acid | 3-amino-2-naphthol-5,7-disulphonic acid | reddish-tinged brown |
| 71 | 2-amino-4-nitrophenol | 8-amino-1-naphthol-3,6-disulphonic acid | grey |
| 72 | 6-nitro-1-diazo-2-naphthol-4-sulphonic acid | 6-amino-1-naphthol-3-sulphonic acid | grey |

EXAMPLE 73

If the metal-free azo dyestuff in Example 67 is replaced by an equivalent amount of the azo dyestuff prepared from the diazonium salt of 2-amino-4,6-dichlorophenol by coupling to 8-amino-1-naphthol-3,6-disulphonic acid at pH 8, a dyestuff which dyes cotton and viscose staple navy blue is obtained. In the form of the free acid, the dyestuff corresponds to the formula

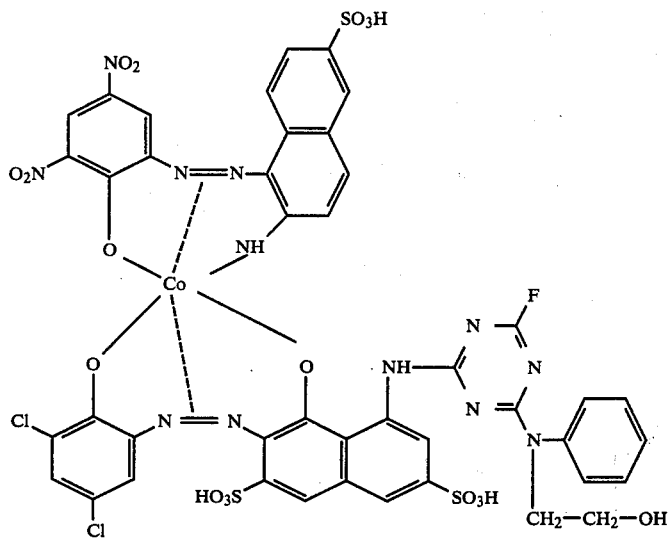

EXAMPLE 74

77.8 g of the dyestuff prepared from 2-amino-6-nitrophenol-4-sulphonic acid and 2-naphthol by diazotisation and coupling are stirred in 500 ml of water at 80° C.

The 1:1 chromium complex which is obtained by diazotising 44.7 g of 2-amino-4-chlorophenol-6-sulphonic acid, coupling the diazotisation product to 72.6 g of 8-amino-1-naphthol-3,5-disulphonic acid at pH 8, chroming the coupling product with 32 g of chromium trichloride in acid solution and salting out and filtering off the product, are introduced into this suspension at pH 8 in the course of 1 hour.

The unsymmetric 1:2 chromium complex azo dyestuff is intermediately isolated and condensation reactions are carried out with 20 ml of cyanuric fluoride at pH 5 and 0° C. and with 31 g of N-(2-hydroxyethyl)-aniline at pH 7 and at 25° C. The dyestuff is salted out, filtered off and dried. The dyestuff, which, in the form of the free acid, corresponds to the formula

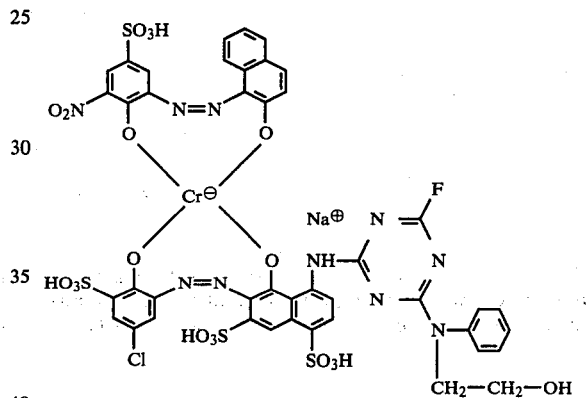

dyes cotton and viscose staple blue-grey.

EXAMPLE 75

If the 2-amino-4-chlorophenol-6-sulphonic acid in Example 74 is replaced by a corresponding amount of 2-amino-4-nitrophenol-6-sulphonic acid, an unsymmetric 1:2 chromium complex dyestuff with which cellulose materials can be dyed or printed in blue-grey shades is obtained. Symmetric 1:2 chromium complex azo dyestuffs are obtained when the diazo components and coupling components indicated in the following table are employed according to the instructions of Example 74 and condensation reactions are carried out with cyanuric fluoride and, finally with N-(2-hydroxyethyl)-aniline.

| Example No. | Diazo component | Coupling component | Colour shade on cotton |
|---|---|---|---|
| 76 | 2-aminobenzoic acid | 6-amino-1-naphthol-3-sulphonic acid | brown |
| 77 | " | 6-amino-1-naphthol-3,5-disulphonic acid | brown |
| 78 | 2-amino-4-chlorophenol | 8-amino-1-naphthol-3,6-disulphonic acid | blue-grey |
| 79 | " | 8-amino-1-naphthol-3,5-disulphonic acid | blue-grey |
| 80 | 2-amino-4-nitrophenol | " | blue-grey |
| 81 | 2-amino-5-nitrophenol | " | blue grey |
| 82 | " | 8-amino-1-naphthol-3,6-disulphonic acid | blue-grey |
| 83 | 2-amino-4-nitrophenol | " | blue-grey |
| 84 | 6-nitro-1-diazo-2-naphthol- | 6-amino-1-naphthol-3-sulphonic acid | grey |

| Example No. | Diazo component | Coupling component | Colour shade on cotton |
|---|---|---|---|
| | 4-sulphonic acid | | |

EXAMPLE 85

If the 8-amino-1-naphthol-3,5-disulphonic acid in Example 74 is replaced by an equivalent amount of 8-amino-1-naphthol-3,6-disulphonic acid, a dyestuff with which cotton and viscose staple can be dyed or printed blue-grey is obtained.

Further outstanding grey to black dyestuffs are obtained by mixing cobalt complex dyestuffs with chromium complex dyestuffs, for example by mixing Example 84 with Example 72 and Example 83 with Example 71, it being possible for the mixing ratio to vary between 30:70 and 70:30.

EXAMPLE 86

30.0 g of the disodium salt of 1-amino-4-(4'-aminophenylamino)-anthraquinone-2,3'-disulphonic acid are dissolved in 600 ml of water. The solution is cooled to 0°–5° and the pH value is adjusted to 4.5. 5.6 ml of cyanuric fluoride are now added dropwise at 0°–5° in the course of 10 minutes, the pH value is kept at 4.2–4.7 with 2 N sodium carbonate solution and, after the dropwise addition, the mixture is subsequently stirred for 15 minutes, until the consumption of sodium carbonate has ceased and the condensation reaction has ended.

8.7 g of N-(2-hydroxyethyl)-aniline are now added to the solution of the difluorotriazinyl dyestuff and the pH value of the reaction mixture is kept at 7.0–7.5. After subsequently stirring the reaction mixture for about two hours, the temperature is 20° C. The condensation reaction has ended. The dyestuff is gradually salted out with 100 g of sodium chloride and filtered off and the filter cake is washed with 10% strength sodium chloride solution. After drying at 40° in vacuo, a dyestuff which, in the form of the free acid, corresponds to the formula

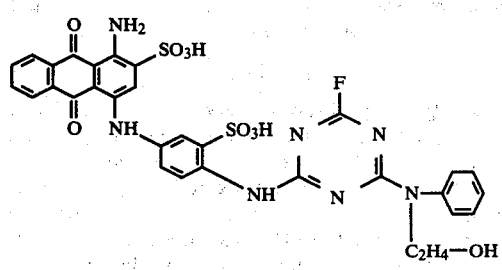

and dyes cotton, from a long liquor at 40°, in strong, greenish-tinged blue shades with very good fastness to light and wet processing is obtained.

EXAMPLE 87

28.0 g of 1-amino-4-(5'-amino-2',4',6'-trimethyl-phenylamino)-anthraquinone-2,3'-disulphonic acid are dissolved, at pH 4.5, in 300 ml of water and the solution is cooled to 0°–5°. 5.2 ml of cyanuric fluoride are added dropwise in the course of 5 minutes and the pH value of the solution is kept at 4.5 with 2 N sodium carbonate solution. The mixture is subsequently stirred at this pH value for a further 15 minutes, 8.0 g of N-(2-hydroxyethyl)-aniline are then added and the pH value is adjusted to 7.0–7.5 with sodium carbonate solution. Stirring is continued at this pH value for a further 1 hour, during which the temperature is allowed to rise to 20°, and the dyestuff of the formula

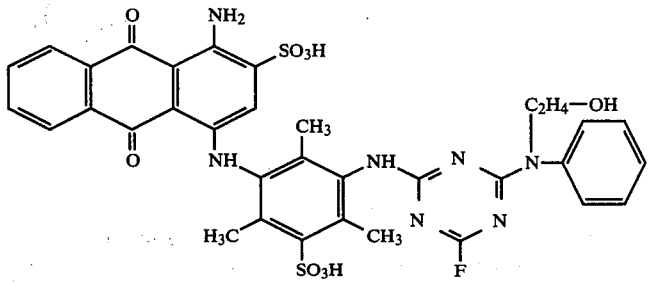

is salted out with 25 g of sodium chloride. The dyestuff is filtered off, washed with 500 ml of 15% strength sodium chloride solution and dried at 40° in vacuo. It dyes cotton, from a long liquor at 40°, in brilliant, reddish-tinged blue shades with excellent fastness to light and wet processing.

EXAMPLE 88

30.0 g of 1-amino-4-(3'-aminophenylamino)-anthraquinone-2,4'-disulphonic acid are dissolved in 400 ml of water. The solution is adjusted to pH 4.5 and is cooled to 0°–5°. 6.2 ml of cyanuric fluoride are added dropwise in the course of 10–15 minutes. The acid liberated is buffered with 2 N sodium carbonate solution such that the pH value is kept between 4.2 and 4.7. After the dropwise addition, the mixture is stirred for a further 15 minutes and 9.6 g of N-(2-hydroxyethyl)-aniline are then added. For the condensation reaction, the pH value of the reaction solution is kept at 6.0–6.5 with 2 N sodium carbonate solution and the temperature is further kept at 0°–5°. After subsequently stirring the mixture for one hour, the reaction has ended and the consumption of sodium carbonate has virtually ceased. The solution is warmed to 20° and the dyestuff is salted out with 130 g of sodium chloride in the course of 2 hours. It is filtered off, washed with 200 ml of 20% strength sodium chloride solution and then with 400 ml of 15% strength sodium chloride solution and dried at 40° in vacuo. It corresponds, in the form of the free acid, to the formula

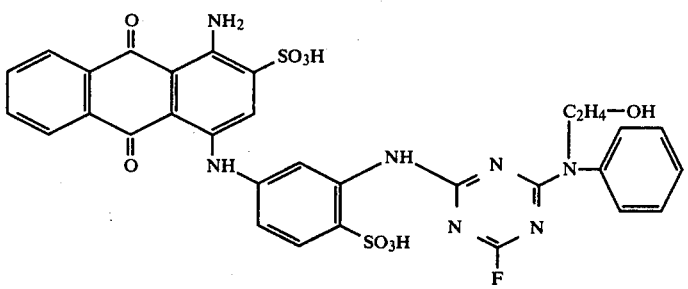

and dyes cotton, from a long liquor, in a neutral blue shade which is fast to light and wet processing.

EXAMPLE 89

If 30.8 g of the disodium salt of 1-amino-4-(4'-methylaminophenylamino)-anthraquinone-2,3'-disulphonic acid are employed in Example 86 instead of the anthraquinone compound described in that example and the procedure is otherwise in accordance with the instructions given in Example 86, a dyestuff which, in the form of the free acid, corresponds to the formula

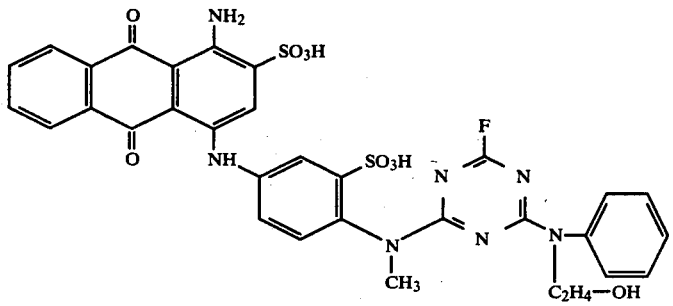

and dyes cotton, from a long liquor, in greenish-tinged blue shades which are very fast to light and wet processing is obtained.

EXAMPLE 90

36.6 g of 1-amino-4-(3'-amino-2'-methylphenylamino)-anthraquinone-2,5'-disulphonic acid are dissolved in 150 ml of tetramethylenesulphone and 21.5 ml of N,N-dimethylaniline. After cooling the solution to 0°-5°, 6.9 ml of cyanuric fluoride are added dropwise in the course of 15 minutes. 10.7 g of N-(2-hydroxyethyl)aniline are dissolved in 600 ml of water. The solution is adjusted to a pH value of 6.0 with hydrochloric acid and is cooled to 0°-5°. The solution of the difluorotriazinylanthraquinone component is then added dropwise to the aqueous hydroxyethylaniline solution in the course of about 20 minutes and the pH value of the reaction mixture is kept at 5.5–5.7 by means of 2 N sodium carbonate solution. After subsequently stirring the mixture for about three hours, the condensation reaction between the fluorotriazinyl component and the hydroxyethylaniline has ended. The resulting solution is added dropwise to 800 ml of sautrated sodium chloride solution and 240 ml of water and the temperature of the suspension is kept at 20°. The dyestuff of the formula

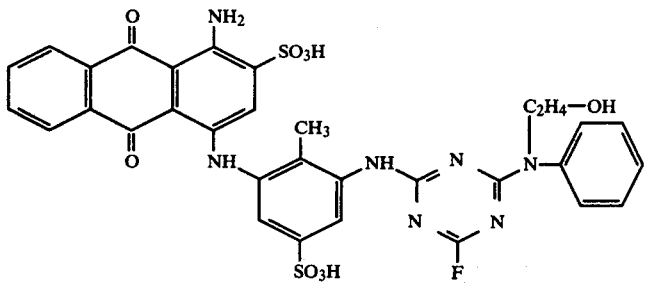

which has precipitated is filtered off, washed with 1 liter of 15% strength sodium chloride solution and dried at 40° in vacuo.

It dyes cotton, from a long liquor, in a neutral blue shade with good fastness to light and wet processing.

1-Amino-4-(4'-aminophenylamino)-anthraquinone-2,2'-disulphonic acid and 1-amino-4-(4'-methylaminophenylamino)-anthraquinone-2,2'-disulphonic acid can be reacted in the same manner.

EXAMPLE 91

32.0 g of the disodium salt of 1-amino-4-(4'-aminophenylamino)-anthraquinone-2,2'-disulphonic acid are dissolved in 460 ml of water. The solution is adjusted to a pH value of 3.5 and is cooled to 0°-5°. 5.9 ml of cyanuric fluoride are now allowed to run in over a period of 2-3 minutes and the pH value of the solution is kept at 3.2-3.5 with 2 N sodium carbonate solution; at the same time, the temperature is kept at 0°-5° by adding a little ice. After the dropwise addition of the cyanuric fluoride, the mixture is subsequently stirred under the conditions indicated for a further 10-15 minutes, the pH value is then adjusted to 5.5 to 9.1 g of N-(2-hydroxyethyl)-aniline are added to the solution of the difluorotriazinyl component.

The pH value is now kept at 7.0-7.5 by adding 2 N sodium carbonate solution dropwise, and the temperature is maintained further at 0°-5°. After subsequently stirring the mixture for about three hours, the condensation reaction has ended and the temperature has reached room temperature. The dyestuff, which may have partly precipitated, is salted out with 10% strength sodium chloride solution. The dyestuff of the formula

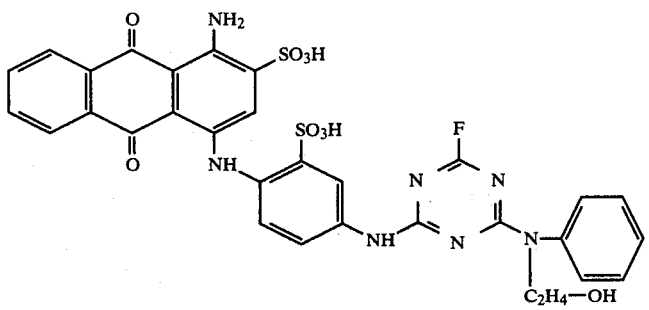

is dried at 40° in vacuo. It dyes cotton, from a long liquor, in greenish-tinged blue shades which are fast to light and wet processing.

Further anthraquinone dyestuffs are obtained in an analogous manner when the anthraquinone components listed in the second column of the table are subjected to a condensation reaction with cyanuric fluoride and the intermediate products are then reacted with N-(2-hydroxyethyl)-aniline.

| Example No. | Anthraquinone component | Colour shade on cotton |
| --- | --- | --- |
| 92 | 1-amino-4-(5'-amino-2'-methylphenylamino)-anthraquinone-2,4'-disulphonic acid | blue |
| 93 | 1-amino-4-(4'-aminophenylamino)-anthraquinone-2,4',6-trisulphonic acid | greenish-tinged blue |
| 94 | 1-amino-4-(5'-amino-2'-methoxyphenylamino)-anthraquinone-2,4-disulphonic acid | greenish-tinged blue |
| 95 | 1-amino-4-(3'-aminophenylamino)-anthraquinone-2,4',5-trisulphonic acid | greenish-tinged blue |
| 96 | a mixture of 1-amino-4-(4'-aminophenylamino)-anthraquinone-2,3',5- and -2,3',8-trisulphonic acid | greenish-tinged blue |
| 97 | 1-amino-4-(3'-aminophenylamino)-anthraquinone-2,7-disulphonic acid | somewhat greenish-tinged blue |
| 98 | 1-amino-4-(6'-aminomethyl-4'-methylphenylamino)-anthraquinone-2,2'-disulphonic acid | reddish-tinged blue |
| 99 | 1-amino-4-(3'-methylaminomethyl-2',6'-dimethylphenylamino)-anthraquinone-2,3'- and 2,4'-disulphonic acid | reddish-tinged blue |
| 100 | 1-amino-4-(3'-amino-4'-methylphenylamino)-anthraquinone-2,2'-disulphonic acid | blue |
| 101 | 1-amino-4-(4'-methylaminomethylphenylamino)-anthraquinone-2,2'-disulphonic acid | blue |
| 102 | 1-amino-4-(4'-aminophenylamino)-anthraquinone-2,6-disulphonic acid | greenish-tinged blue |
| 103 | 1-amino-4-(3'-aminophenylamino)-anthraquinone-2,6-disulphonic acid | somewhat greenish-tinged blue |

EXAMPLE 104

35.0 g of a dyestuff component which is formed by reacting 1 mol of copper phthalocyanine-3,3',3'',3'''-tetrasulphonic acid chloride with 1 mol of 3-aminoacetanilide, subsequently saponifying the unreacted sulphochloride groups and then saponifying the acetylamino group in hot, dilute hydrochloric acid are dissolved, at pH 6-7, in 700 ml of water. After cooling the solution to 0°-5°, the pH value is adjusted to 4.5 and 3.6 ml of cyanuric fluoride are added dropwise in the course of 5 minutes, during which the pH value is kept between 4.0 and 4.3 by adding 20% strength sodium carbonate solution dropwise. When the reaction has ended and the consumption of sodium carbonate has ceased, 5.6 g of N-(2-hydroxyethyl)-aniline are added and the pH value is now kept at 7.0-7.5 with sodium carbonate solution. After 3 hours, the solution has warmed to room temperature and the condensation reaction has ended. The dyestuff, which corresponds to the formula

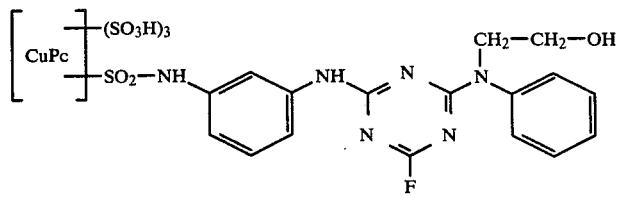

[CuPc] = copper phthalocyanine is salted out with sodium chloride, filtered off and washed with sodium chloride solution. It is dried at 40° in vacuo. On cotton, from a long liquor, the dyestuff gives turquoise blue colour shades which are fast to light and wet processing.

Further blue or green dyestuffs are obtained when the following phthalocyanine components are subjected to a condensation reaction with cyanuric fluoride and N-(2-hydroxy-ethyl)-aniline in an analogous manner.

| Example No. | Phthalocyanine component | Color shade |
|---|---|---|
| 105 | copper phthalocyanine-3,3',3''-(trisulphonic acid)-3'''-sulphonic acid 3-amino-4-sulpho-phenylamide | turquoise |
| 106 | copper phthalocyanine-3,3',3''-(trisulphonic acid)-3'''-sulphonic acid 4-amino-3-sulpho-phenylamide | " |
| 107 | copper phthalocyanine-3,3',3''-(trisulphonic acid)-3'''-sulphonic acid 4-amino-phenylamide | " |
| 108 | copper phthalocyanine-3,3',3''-(trisulphonic acid)-3'''-sulphonic acid 2-aminoethylamide | " |
| 109 | copper phthalocyanine-3,3'-(disulphonic acid)-3''-sulphonic acid 3-amino-4-sulpho-phenylamide | " |
| 110 | copper phthalocyanine-3,3'-(disulphonic acid)-3''-sulphonic acid 4-amino-3-sulphophenylamide | " |
| 111 | copper phthalocyanine-3,3',3''-(trisulphonic acid)-3'''-sulphonic acid 4-amino-3-carboxy-phenylamide | " |
| 112 | nickel phthalocyanine-3,3',3''-(trisulphonic acid)-3'''-sulphonic acid 3-aminophenylamide | bluish-tinged green |
| 113 | nickel phthalocyanine-3,3',3''-(trisulphonic acid)-3'''-sulphonic acid 4-amino-3-sulpho-phenylamide | bluish-tinged green |
| 114 | nickel phthalocyanine-3,3',3''-(trisulphonic acid)-3'''-sulphonic acid 4-aminophenylsulphamide | bluish tinged green |
| 115 | copper phthalocyanine-3,3',3''-(trisulphonic acid)-3'''-sulphonic acid-4-amino-2-sulpho-phenylamide | turquoise |
| 116 | copper phthalocyanine-3,3',3''-(trisulphonic acid)-3'''-sulphonic acid 5-amino-2-sulpho-phenylamide | " |
| 117 | copper phthalocyanine-4,4',4''-(trisulphonic acid)-4'''-sulphonic acid 3-aminophenylamide | " |
| 118 | copper phthalocyanine-4,4',4''-(trisulphonic acid)-4'''-sulphonic acid 3-amino-4-sulpho-phenylamide | " |
| 119 | copper phthalocyanine-4,4',4''-(trisulphonic acid)-4'''-sulphonic acid 4-amino-3-sulpho-phenylamide | " |
| 120 | copper phthalocyanine-3,3'-(disulphonic acid)-3''-(sulphonic acid 3-amino-4-sulphophenylamide)-3'''-sulphonic acid amide | " |
| 121 | copper phthalocyanine-3,3'-(disulphonic acid)-3''-(sulphonic acid 4-amino-3-sulphophenylamide)-3'''-sulphonic acid amide | " |

EXAMPLE 122

The diazonium salt of 22.1 g of 2-aminophenol-4-sulphonic acid is coupled to 19.2 g of α-formylphenylacetic acid ethyl ester at pH 8. The mixture is boiled at pH 10 for 30 minutes and the solution of the saponification product is coupled with the diazonium salt of 23.0 g of 2-amino-5-acetylaminobenzoic acid at pH 5.

Thereafter, the acetylamino group is saponified by warming the mixture at pH 9.5 for one hour and the formazan dyestuff is salted out, isolated and reacted with 25 g of copper-II sulphate pentahydrate at pH 3. The dyestuff is salted out and isolated.

The dissolved paste is subjected to successive condensation reactions with 10 ml of cyanuric fluoride at pH 5 and at 0° C. and 15.4 g of N-(2-hydroxyethyl)-aniline at pH 7 and at 25° C. With the dyestuff of the formula

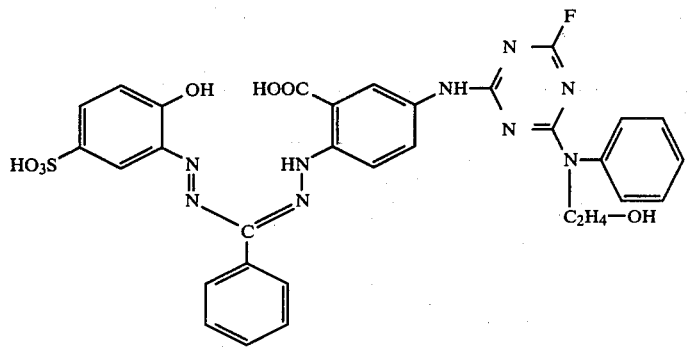

Cu-Komplex

Cu complex cotton and viscose staple are dyed in a blue shade which is fast to light and washing.

EXAMPLE 128

The diazonium salt of 73.8 g of 2-amino-6-acetylaminophenol-4-sulphonic acid is coupled, at pH 9, to the hydrazone prepared from 31.8 g of benzaldehyde and 45.6 g of 2-hydrazinobenzoic acid. Thereafter, the acetylamino group is saponified by warming the mixture to 95° C. at pH 10 for one hour. The mixture is adjusted to pH 3 with concentrated hydrochloric acid and the formazan is reacted with 75.0 g of copper-II sulphate pentahydrate. After salting out and filtering off the dyestuff, the moist paste is stirred in 1.5 l of water and successive condensation reactions are carried out with 28 ml of cyanuric fluoride at pH 6.5 and at 0° C. and with 43.2 g of N-(2-hydroxyethyl)-aniline at pH 7 and 25° C. With the dyestuff which, in the form of the free acid, corresponds to the formula

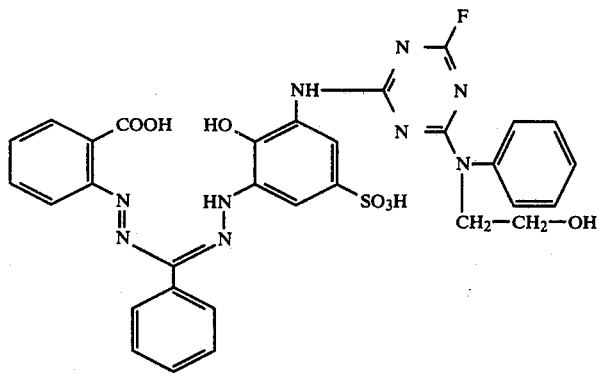

cotton and viscose staple can be dyed or printed in blue shades which are fast to light and washing.

We claim:

1. Reactive dyestuffs of the formula

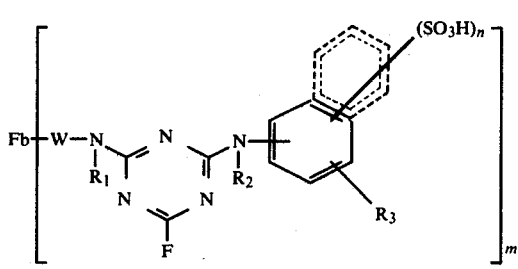

wherein

Fb denotes the radical of an organic dyestuff,

W denotes a direct bond or a bridge member, W being bonded to a C atom of an aromatic-carbocyclic ring of the chromophor Fb, $R_1$ denotes hydrogen, optionally substituted $C_1$-$C_4$-alkyl or aralkyl, $R_2$ denotes $C_2H_4$—OH, $R_3$ denotes hydrogen, $C_1$-$C_4$-alkyl, $C_1$-$C_4$-alkoxy, halogen, carboxyl, $C_1$-$C_4$-alkoxycarbonyl, $C_1$-$C_4$-alkyl- or -dialkyl-aminocarbonyl, optionally substituted arylaminocarbonyl, sulpho, $C_1$-$C_4$-alkyl- or -dialkyl-aminosulphonyl, hydroxyl, optionally substituted $C_1$-$C_4$-alkyl- or aryl-carbonylamino, formylamino, oxalylamino, optionally substituted ureido or sulphomethylene, n is 0, 1, 2 or 3 and m is 1 or 2.

2. Reactive dyestuffs of the formula

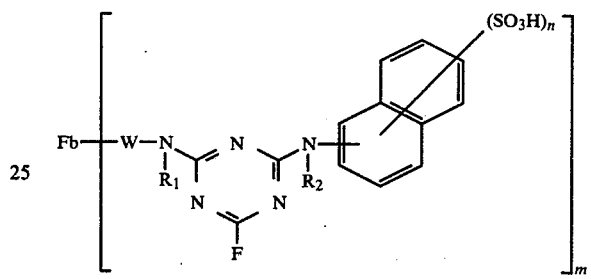

wherein Fb, W, $R_1$, $R_2$, m and n have the meaning given in claim 1.

3. Reactive dyestuffs of the formula wherein

Fb, W, $R_1$, $R_2$, $R_3$ and m have the meaning given in claim 1.

4. Reactive dyestuffs of claim 1, in which m denotes 1 and

Fb denotes the radical of a water-soluble azo dyestuff, anthraquinone dyestuff, phthalocyanine dyestuff or formazan dyestuff, the radical of such a dyestuff being devoid of or containing sulpho groups.

5. Dyestuffs of claim 1, in which $R_1$ and $R_3$ denote H, $R_2$ denotes —$CH_2$—$CH_2$—OH and W denotes a direct bond, the dyestuffs containing 1–8 sulpho groups.

6. A method for dyeing and printing fibre materials, containing hydroxyl groups or nitrogen which comprises applying to said material the dyestuffs of claim 1.

7. Fibre materials, containing hydroxyl groups or nitrogen, dyed or printed with the dyestuffs of claim 1.

8. A reactive dyestuff of claim 1 wherein $R_3$ is chlorine.

9. A reactive dyestuff of claim 4 wherein the radical of said dyestuff contains sulpho groups.

* * * * *